C. B. SANROPE.
GRAIN AND HAY LOADER.
APPLICATION FILED MAR. 24, 1908.
910,088.
Patented Jan. 19, 1909.
4 SHEETS—SHEET 1.
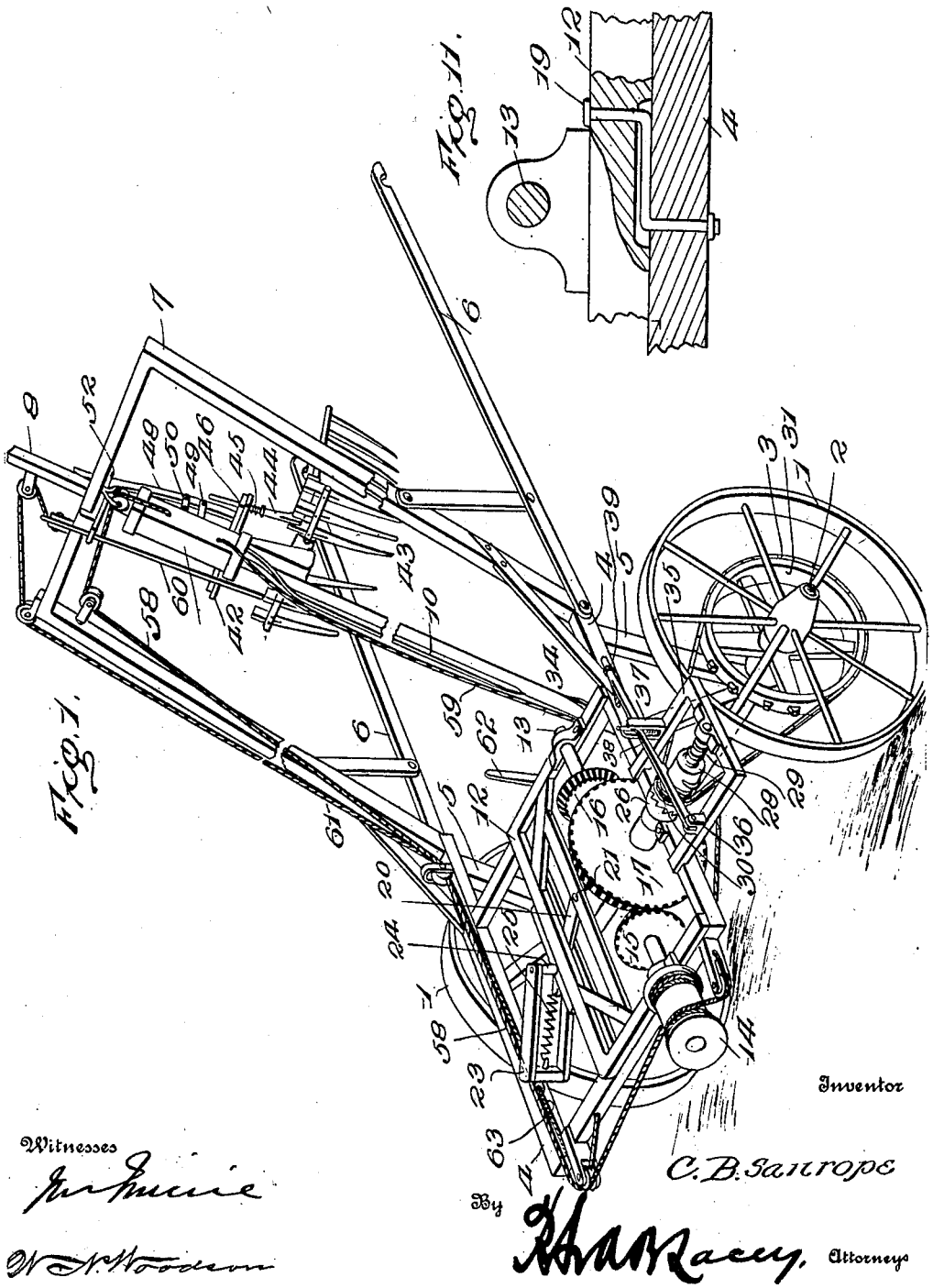
Witnesses
Inventor
C. B. Sanrope
By
Racey, Attorneys

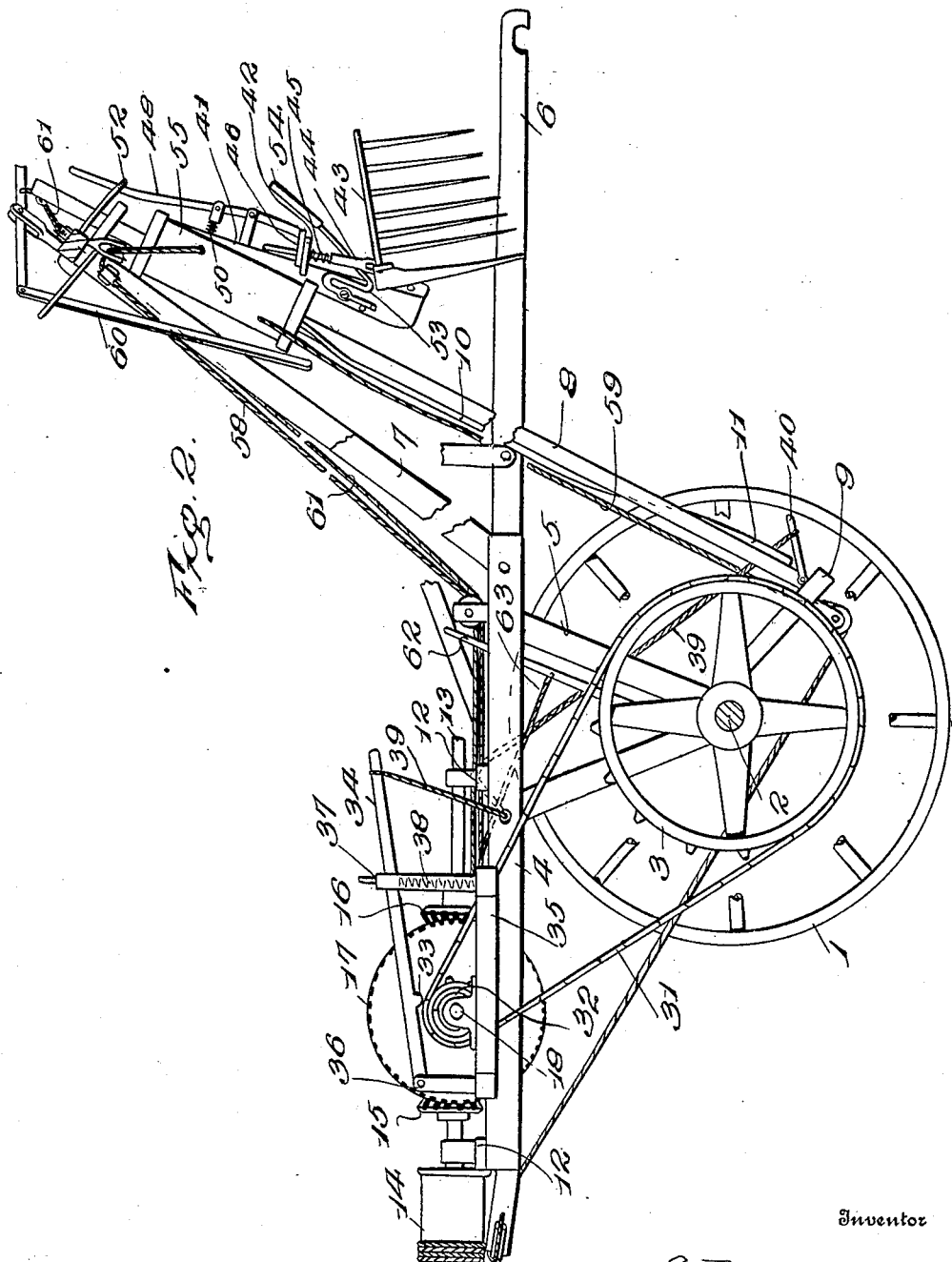

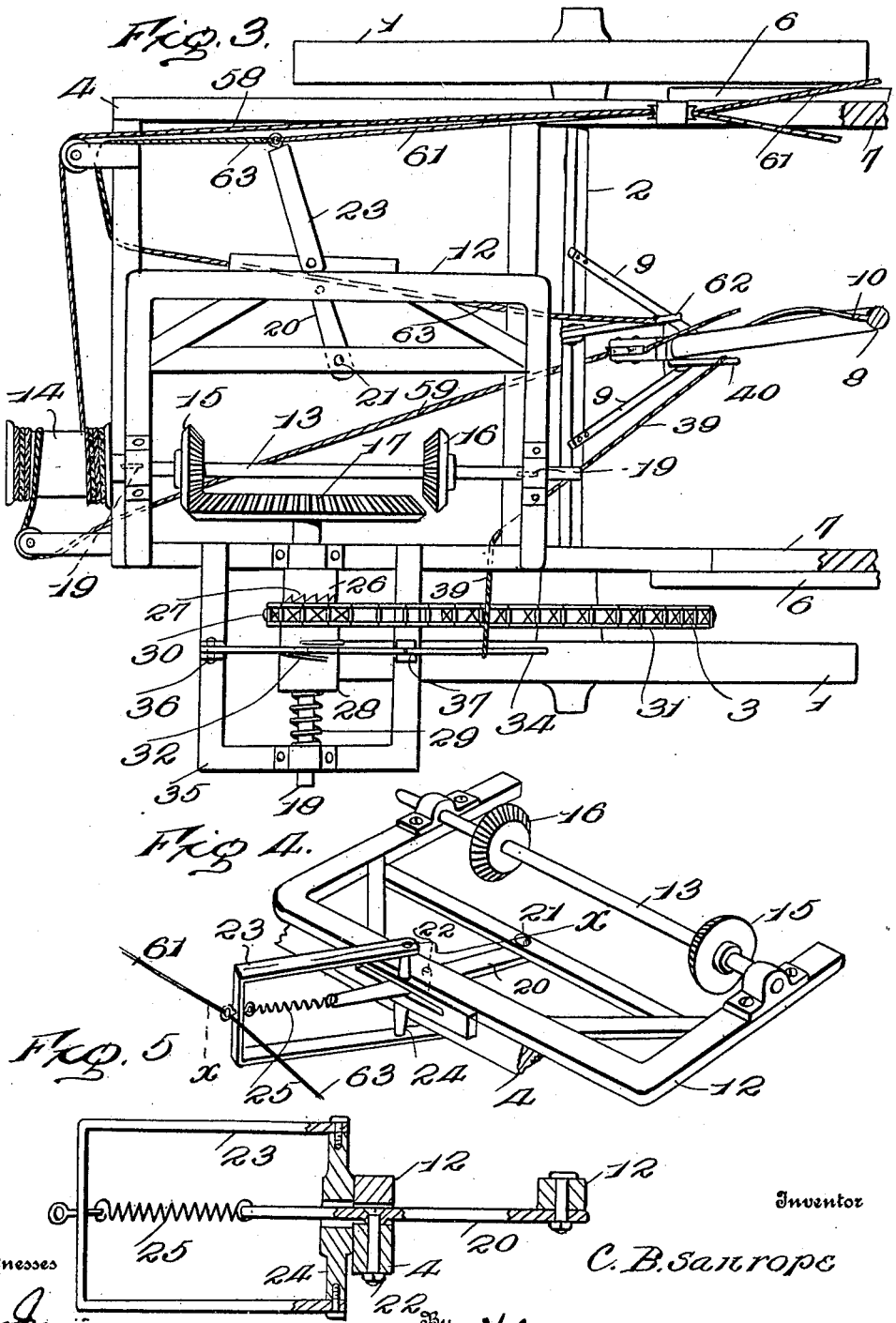

C. B. SANROPE.
GRAIN AND HAY LOADER.
APPLICATION FILED MAR. 24, 1908.
910,088.
Patented Jan. 19, 1909.
4 SHEETS—SHEET 4.
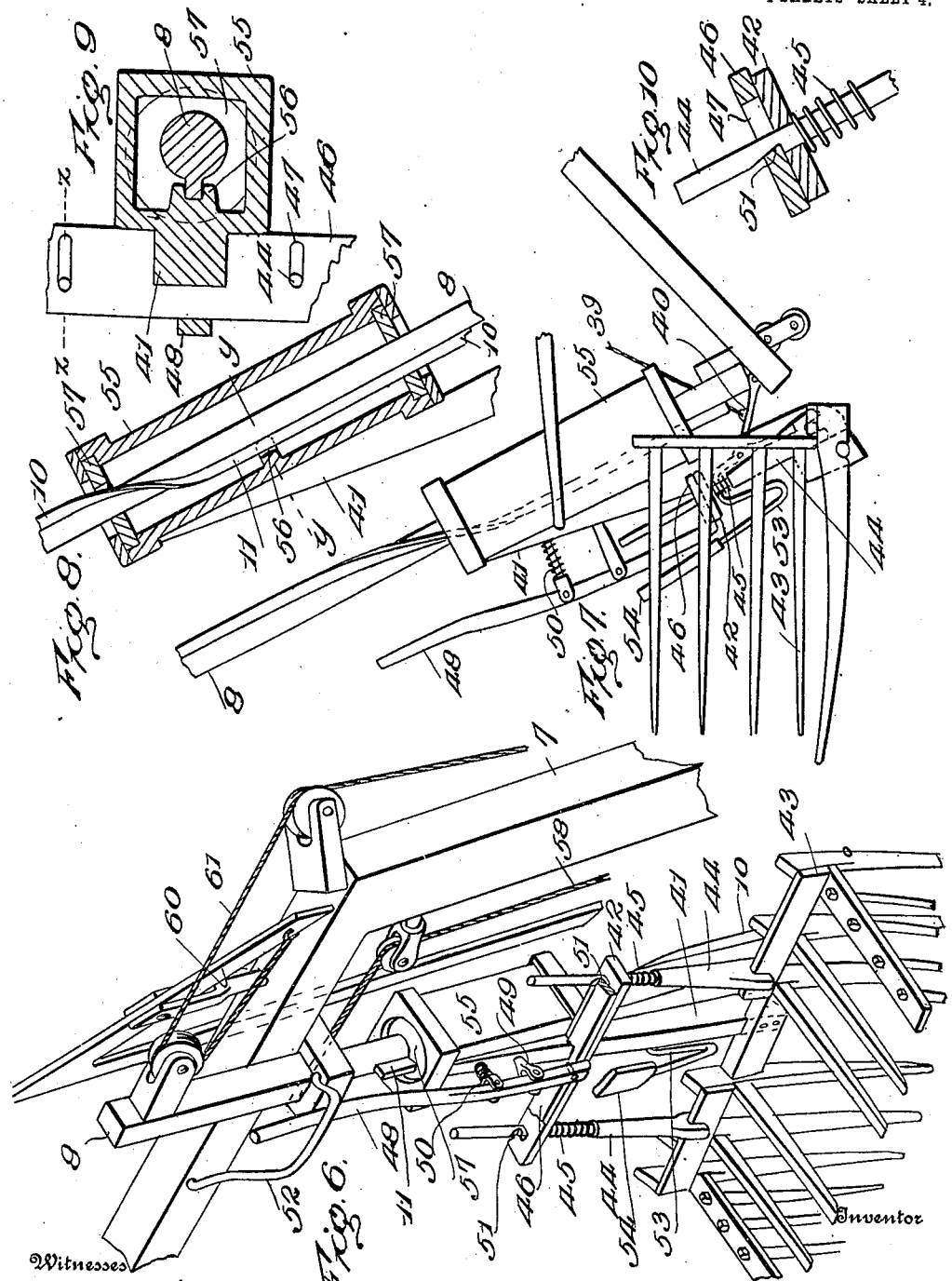

UNITED STATES PATENT OFFICE.

CARL B. SANROPE, OF GREENWOOD, WISCONSIN.

GRAIN AND HAY LOADER.

No. 910,088.  Specification of Letters Patent.  Patented Jan. 19, 1909.

Application filed March 24, 1908. Serial No. 422,915.

*To all whom it may concern:*

Be it known that I, CARL B. SANROPE, a citizen of the United States, residing at Greenwood, in the county of Vernon and State of Wisconsin, have invented certain new and useful Improvements in Grain and Hay Loaders, of which the following is a specification.

The present invention relates to machines for facilitating the handling of loads, being particularly designed for operation in the field for lifting shocks and depositing the same in a wagon or other vehicle for transportation to a stack, granary or place of storage.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a hay or grain loader embodying the invention. Fig. 2 is a side view of the machine, parts being broken away. Fig. 3 is a top plan view of the loader, the upright frame and the guide shaft being in horizontal section in a plane just above the plane of the main frame. Fig. 4 is a detail perspective view of the shiftable frame, having the shaft mounted thereon provided with the drum for raising and lowering the load carrier or fork. Fig. 5 is a transverse section on the line $x$—$x$ of Fig. 4. Fig. 6 is a detail perspective view of the load carrier or fork and the upper portions of the guide shaft and upright frame, together with adjunctive parts. Fig. 7 is a side view of the load carrier or fork and the lower portion of the shaft. Fig. 8 is a longitudinal section of the guide to which the fork is attached and a portion of the guide shaft. Fig. 9 is a horizontal section on the line $y$—$y$ of Fig. 8. Fig. 10 is a section on the line $z$—$z$ of Fig. 9. Fig. 11 is a detail view of the connection between the main and shifter frames.

Corresponding and like parts are referred to in the following description and indicated in all the views of the drawings by the same reference characters.

The loader is mounted upon wheels 1 provided at the ends of an axle 2, one of said wheels being utilized as a driver and provided with a toothed rim 3. The main frame 4 may be of any construction and comprises longitudinal and transverse bars. Hangers 5 connect the main frame with the axle 2. Draft bars 6 are adapted to connect the loader to the wagon into which the shock or other load is to be delivered. An upright frame 7 projects from the front portion of the main frame and inclines from the vertical so as to overhang the wagon and thereby admit of the load dropping therein when released.

A guide shaft 8 inclines upwardly and forwardly and is secured at its upper end to a cross bar of the frame 7 and at its lower end to bars 9 projected from the axle 2. The guide shaft 8 is provided with a rib or spline whose middle portion 10 is straight and whose end portions 11 make a half turn about the shaft so as to impart a rotary movement to the load carrier or fork during its vertical movements. When the load carrier or fork is at the limit of its downward movement, it faces forward so as to pick up the shock or load as the machine is drawn over the field and during the first part of the ascent of the load carrier it makes a one-half turn with the result that it faces rearward during the major portion of the upward travel. As the load carrier or fork completes its upward travel, it is again given a one-half turn, thereby bringing the load over the wagon so as to be discharged therein when released. By having the load carrier mounted to turn in its upward travel, the machine may be arranged close to the wagon, and the load clears said wagon when lifted, and the fork clears the wagon on its descent.

A shifter frame 12 is mounted upon the main frame and supports a longitudinal shaft 13 bearing a drum 14 and pinions 15 and 16. The parts 14, 15 and 16 are fast to the shaft 13 so as to rotate therewith. A gear wheel 17 fast to the inner end of a transverse shaft 18 is adapted to mesh with either of the pinions 15 or 16 so as to positively drive said shaft in either direction to effect a lifting or a lowering of the load carrier or fork, as may be required. Crank connections 19 are interposed between the shifter frame and the main frame and are so arranged as to form a lock joint and hold either of the pinions 15 and 16 in mesh with the gear wheel 17. A lever 20 is pivoted at 21 to the shifter frame and is pivoted at 22 to the main frame 4 and has connection with trips at opposite ends of the guide shaft and adapted to be actuated automatically by the load carrier or fork. A frame 23 is pivotally connected at its inner end to a post 24 and a spring 25 connects the outer end of said frame 23 with the outer end of the lever 20. The frame 23 has direct connection with the aforementioned trips, whereas the lever 20 has indirect connection with said trips through the spring 25 and frame 23. When the frame 23 is moved in either direction, the spring 25 is subjected to tension and moves the lever 20, thereby throwing the shifter frame in the required direction, the spring 25 reacting to complete the movement of the shifter frame so as to throw the crank connections 19 beyond a dead center to form the lock joint for holding either one of the pinions 15 or 16 in positive engagement with the gear wheel 17. A half clutch 26 is fast to the shaft 18 and coöperates with a half clutch 27 at the inner end of a sleeve 28 loose upon said shaft 18 and pressed inward by means of a spring 29. A toothed pinion 30 is formed with or fast to the sleeve 28 and a drive chain 31 connects the same with the toothed rim or gear 3. A cam 32 is provided upon the sleeve 28 and coöperates with a projection 33 of a lever 34 to throw the loader out of gear when the load carrier or fork is at its lowest position and receiving the load. The shaft 18 is mounted at its outer end in a bearing provided upon an extension 35 of the main frame. The lever 34 is pivoted at one end to a post 36 projected upward from the extension 35 and is directed in its movements by means of a guide 37 projected upward from the front portion of said extension 35. A spring 38 normally exerts an upward pressure upon the free end of the lever 34 so as to hold the projection 33 clear of the cam 32. A cord 39 or like means connects the forward end of the lever 34 with a trip 40 at or near the lower end of the guide shaft 8 so that when the trip 40 is actuated the free end of the lever 34 is depressed, thereby bringing its projection 33 into the path of the cam 32, with the result that in the further rotation of the sleeve 28, the latter is moved outward and throws the clutch 26 and 27 out of engagement.

The load carrier consists of a stem 41 having a cross bar 42 and a pivoted fork 43, the latter being mounted so as to assume either an approximately vertical position or a substantially horizontal position, the fork projecting from opposite sides of the stem 41 a like distance so as to equalize the weight of the load thereon. The fork is of such construction as to prevent the load from falling backward or over the ends. Arms 44 have pivotal connection at their lower ends with the fork 43 in the rear of its axis and their upper ends are reduced and pass through openings in the end portions of the cross bar 42. Springs 45 mounted upon the reduced end portions of the arms 44 and confined between the shoulders at the base thereof and the cross bar 42 serve to normally exert a downward pressure upon said arms, whereby the fork is assisted in discharging the load and is also held in normal position in conjunction with a latch 46. The latch 46 is mounted upon the cross bar 42 and has slots 47 through which the arms 44 project. A lever 48 pivoted to a lug 49 projected from the stem 41, has the latch 46 attached to its lower end, said lever projecting upward and normally acted upon by means of a spring 50, which serves to hold the latch 46 in engagement with the arms 44, the latter being notched at 51 to receive the said latch. The latch 46 holds the fork in approximately horizontal position so as to support the load, and when released permits the fork to turn under the weight of the load and automatically discharge the same. A trip 52 at the upper end of the frame 7 is adapted to engage with the lever 48 when the load carrier is at the limit of its upward movement and draw the same inward, with the result that the latch 46 is moved outward to release the load carrier which discharges the load into the wagon or other receiver. A trip 53 is mounted upon the lower portion of the stem 41 and has a part extended into the path of the trip 40 to actuate the same when the load carrier reaches the limit of its downward movement to operate the lever 34 and throw the operating mechanism out of gear. The trip 53 is provided with a pressure piece 54 which when the fork is loaded, is acted upon to withdraw the trip out of engagement with the trip 40, thereby releasing the lever 34, which is thrown upward by the action of the spring 38, thereby withdrawing the projection 33 from engagement with the cam 32, with the result that the spring 29, regaining itself, moves the sleeve 28 inward and brings the clutch element 27 and 26 into gear so as to rotate the shaft 18 and the shaft 14 to effect an upward movement of the load carrier preliminary to discharging the load into the wagon.

A guide 55 has the load carrier or stem 41 of the wagon connected therewith and is hollow and receives the guide shaft 8. A lug 56 projects inward from a side of the guide 55 and is notched to form spaced portions which embrace opposite sides of the rib at the side of the guide shaft 8. Plates 57 are loosely fitted to the end portions of the guide 55 and close the same, said plates having an opening corresponding to the guide shaft 8 and a notch to receive the rib of the guide shaft. The plates 57 steady the guide and are adapted to move independently so as to prevent binding when the guide is turned upon the shaft near each end thereof. A rope or cord 58 is connected at one end with the load carrier and after passing around suitable guide pulleys is connected at its opposite end to the drum 14 so as to wind thereon and raise the load carrier. A rope or cord 59 is connected with the load carrier and after passing around suitable guide pulleys is connected at its opposite end to the drum 14 to wind thereon in an opposite direction to the cord or rope 58 so as to move the load carrier downward after it has discharged the load. The cords or ropes 58 and 59 may connect with the load carrier in any manner, and, as shown, has direct connection with the guide 55. When the drum 14 is rotated in one direction, a cord or rope 58 is wound thereon and the cord or rope 59 is unwound therefrom, and when said drum is rotated in the opposite direction, the cord or rope 59 is wound thereon and the cord or rope 58 unwound.

A trip 60 is located at the upper end of the frame 7 and a cord 61 connects the same with the frame 23. The trip 60 extends within the path of a portion of the load carrier so as to be engaged thereby and operate the frame 23 to move the shiftable frame 12 and throw the elevating gear out of mesh and the lower gear into engagement, whereby the cord or rope 59 is wound upon the drum 14 and the load carrier drawn downward upon the guide shaft 8. As said load carrier reaches the limit of its downward movement, it operates the trip 40 and throws the machine out of gear by operating lever 34 in the manner herein stated. The load carrier also operates a trip 62, which is connected by means of a rope or cord 63 with the frame 23, whereby the shifting frame 12 is moved to throw the elevating gear or pinion 16 in mesh with the gear 17 so that the instant the operating gearing is thrown into mesh the load carrier is elevated.

Having thus described the invention, what is claimed as new is:

1. In a loading machine of the character specified, the combination of a wagon, an upwardly arranged guide, a load carrier mounted to travel upon said guide, and coöperating means between the guide and load carrier to turn the latter at the beginning of its ascent to enable it to clear the wagon and to again return the same to normal position after clearing the wagon to enable the load to be delivered therein.

2. In a loading machine, the combination of a wagon, a vertically movable load carrier, means for directing the same in its vertical movements, and other means for turning the load carrier to enable it to clear the wagon in its vertical movements.

3. In a loading machine, the combination of an upright guide, a load carrier mounted to travel upon said guide, and an interlocking connection between said guide and load carrier and having its end portions spirally arranged and the intermediate portion straight, whereby the load carrier has a partial rotation imparted thereto when moving upon the end portions of said guide.

4. In a loading machine, the combination of an upright guide, a load carrier mounted to travel upon said guide, a rib at one side of the guide and having its end portions spirally arranged and its intermediate portion straight, a projection extended from the load carrier and coöperating with said rib, and plates at the ends of the load carrier and having loose connection therewith and fitted to the guide and rib thereof.

5. In a loading machine, the combination of a vertically movable load carrier, a drum, cords or ropes having connection with the load carrier and extended in opposite directions and adapted to wind reversely upon said drum, operating means for said drum including a clutch, one member of the clutch having a cam, a lever arranged to coöperate with said cam to effect unshipping of the clutch and normally held out of operative position, and a trip adapted to be operated by the said load carrier to throw the said lever into coöperative relation with the said cam to effect unshipping of the aforesaid clutch.

6. In a loading machine, the combination of a vertically movable load carrier, a drum, connecting means between said drum and load carrier to effect positive movement of the latter in each direction, actuating means for rotating the drum in reverse directions and including a movable element and a clutch, upper and lower trips adapted to be actuated by said load carrier to positively throw the movable element in such direction, and another trip likewise arranged to be operated by the load carrier to throw the said clutch out of gear.

7. In a loading machine, the combination of a vertically movable load carrier, a drum, connecting means between said load carrier and drum, actuating means for positively rotating the drum in reverse directions and including a movable element, a shiftable frame carrying said movable element, and upper and lower trip devices adapted to be actuated by the load carrier to effect positive movement of the shiftable frame.

8. In a loading machine, the combination of a vertically movable load carrier, a drum, connecting means between said load carrier and drum, actuating means for positively rotating the drum in reverse directions and including a movable element, a shiftable frame carrying said movable element, a lever having connection with the shiftable frame, a pivoted frame, a spring connection between said pivoted frame and lever, and upper and lower tripping devices adapted to be actuated by the load carrier to effect movement of said pivoted frame.

9. In a loading machine, the combination of a vertically movable load carrier, a drum, connecting means between said load carrier and drum, actuating means for positively rotating the drum in reverse directions and including a movable element, a shiftable frame carrying said movable element, crank connections between the shiftable frame and its support, a lever having connection with the shiftable frame, a pivoted frame, a spring connecting said pivoted frame with the lever, and trip devices having connection with the pivoted frame and adapted to be actuated by the said load carrier.

10. In a loading machine, the combination of a vertically movable load carrier, actuating means therefor including a clutch, means for throwing said clutch out of gear and normally held out of action, a trip for throwing said clutch disengaging means into operative position, a coöperating trip mounted upon the said load carrier, and a pressure piece attached to the trip mounted upon the load carrier to be acted upon by the load to automatically throw the trip out of action.

In testimony whereof I affix my signature in presence of two witnesses.

CARL B. SANROPE [L. s.]

Witnesses:
THEO. JOHNSON,
HENRY KAUFFMAN.